United States Patent [19]
Lopez

[11] Patent Number: 5,879,184
[45] Date of Patent: Mar. 9, 1999

[54] OUTDOOR ELECTRICAL OUTLET PROTECTOR

[76] Inventor: Juan A. Lopez, 2605 Tourette Court, McKinney, Tex. 75070

[21] Appl. No.: 831,819

[22] Filed: Apr. 2, 1997

[51] Int. Cl.[6] .................................................. H01R 11/00
[52] U.S. Cl. .......................................... 439/502; 307/141
[58] Field of Search ..................................... 439/502, 623, 439/624, 650–655; 307/139, 140, 141; 200/33 R, 38 A

[56] References Cited

U.S. PATENT DOCUMENTS

| | | | |
|---|---|---|---|
| 3,833,779 | 9/1974 | Leone | 307/141 |
| 4,619,489 | 10/1986 | Hinkens | 439/502 |
| 5,228,584 | 7/1993 | Williams, Jr. . | |
| 5,245,507 | 9/1993 | Ericksen . | |
| 5,258,656 | 11/1993 | Pawlick | 307/141 |
| 5,283,475 | 2/1994 | Berger | 307/141 |
| 5,430,598 | 7/1995 | Rodolfo et al. | 307/141 |
| 5,527,993 | 6/1996 | Shotey et al. . | |
| 5,556,289 | 9/1996 | Holbrook, Jr. . | |

*Primary Examiner*—Neil Abrams
*Assistant Examiner*—Brian J. Biggi
*Attorney, Agent, or Firm*—Michael I. Kroll

[57] ABSTRACT

An outdoor electrical outlet protector (10) comprising a waterproof extension cord (12). A timer (14) is electrically built into the waterproof extension cord (12), which will safely connect an outdoor electrical outlet (16) to exterior Christmas lights (18) and exterior security lights (20) on a building (22).

14 Claims, 3 Drawing Sheets

OUTDOOR ELECTRICAL OUTLET PROTECTOR

BACKGROUND OF THE INVENTION

1. Field of the Invention

The instant invention relates generally to weatherproof electrical enclosures and more specifically it relates to an outdoor electrical outlet protector. The outdoor electrical outlet protector consists of a waterproof extension cord with two electrical receptacles and a built-in timer, to safely connect an outdoor electrical outlet with exterior Christmas lights and security lights in a house.

2. Description of the Prior Art

Numerous weatherproof electrical enclosures have been provided in prior art. For example, U.S. Pat. Nos. 5,228,584 to Williams, Jr.,; 5,245,507 to Ericksen; 5,527,993 to Shotey et al. and 5,556,289 to Holbrook, Jr. all are illustrative of such prior art. While these units may be suitable for the particular purpose to which they address, they would not be as suitable for the purposes of the present invention as heretofore described.

Williams, Jr., Howard M.

Weatherproof Electrical Enclosure

U.S. Pat. No. 5,228,584

An electrical enclosure having a base, a cover, and hinge pivotally connecting the base and cover. The cover has a pair of ears, each provided with a key hole for receiving hinge pins mounted on the base. The pivot pins are provided with keys that align with notch portions of the key holes when the cover is disposed at an obtuse angle, preferably about 180 degrees with respect to the base. After assembly, the base is connected to a support which limits the range of pivotal movement of the cover to an angle less than 180 degrees, so that the keys and notch portions can no longer be aligned.

Shotey, Michael J.

McConnaughy, Michael P.

Weatherproof Electrical Outlet Apparatus

U.S. Pat. No. 5,527,993

Weatherproof electrical enclosure apparatus includes an electrical outlet and a cover pivotally secured to the outlet for sealingly engaging outlet elements to prevent moisture and foreign material from contacting electrical elements of the outlet. Secondary sealing elements are included to insure that moisture and foreign elements are prevented from entering into and contacting the electrical elements. The cover is pivotally secured with a releasable hinge to the outlet, and the cover includes an aperture or opening through which a cord extends. Secondary seal elements help to insure that the opening in the cover is sealed about the electrical cords. A primary embodiment includes a boot disposed around the outlet itself, and cords connected to the outlet contact the boot and are sealed by the boot.

Ericksen, Kent C.

Weather Resistant Container for Timer Components of an Irrigation System

U.S. Pat. No. 5,245,507

The invention is a weather resistant container in the nature of a box with tightly fitting cover for a timer unit controlling operation of an irrigation system and associated transformer and electrical plug. The container also houses an electrical receptacle and wiring. Such container is adapted to receive electrical power from an outside source through conventional electrical conduit. Within the box are provided supports for a removable, broad partition wall defining a relatively shallow wiring compartment between the back wall and the partition wall and a relatively deep compartment between the partition wall and Holbrook Jr., Ira C.

Safety Cover for an Electrical Outlet

U.S. Pat. No. 5,556,289

A safety cover for an electrical outlet including a hollow rigid container having a back wall with a periphery extended outwards therefrom and thereby defining a hollow interior, an opening to the interior, and a rim bounding the opening. The back wall further including a plurality of socket holes and a screw hole formed thereon. The socket holes and screw hole are alignable with a screw hole and corresponding socket plugs of an electrical receptacle. A rigid lid positionable over the opening of the container is in contact with the rim. The lid further having a plurality of plug holes formed thereon. Each plug hole is separately alignable with a socket hole of the back wall of the container. A plurality of rigid doors are provided. Each door is positionable within a plug hole of the lid and thereby creating a through hole for receipt of an electrical cord. A coupling mechanism is for removably coupling each door within a separate plug hole of the lid.

SUMMARY OF THE INVENTION

A primary object of the present invention is to provide an outdoor electrical outlet protector that will overcome the shortcomings of the prior art devices.

Another object is to provide an outdoor electrical outlet protector that is a waterproof extension cord with two electrical receptacles and a built-in timer, which will safely connect and outdoor electrical outlet with exterior Christmas lights and security lights in a house.

An additional object is to provide an outdoor electrical outlet protector in which the two electrical receptacles and the built-in timer are in a protective casing that is elevated from the ground, for protection from weather conditions outside of the house.

A further object is to provide an outdoor electrical outlet protector that is simple and easy to use.

A still further object is to provide an outdoor electrical outlet protector that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENTS

Figure 1:
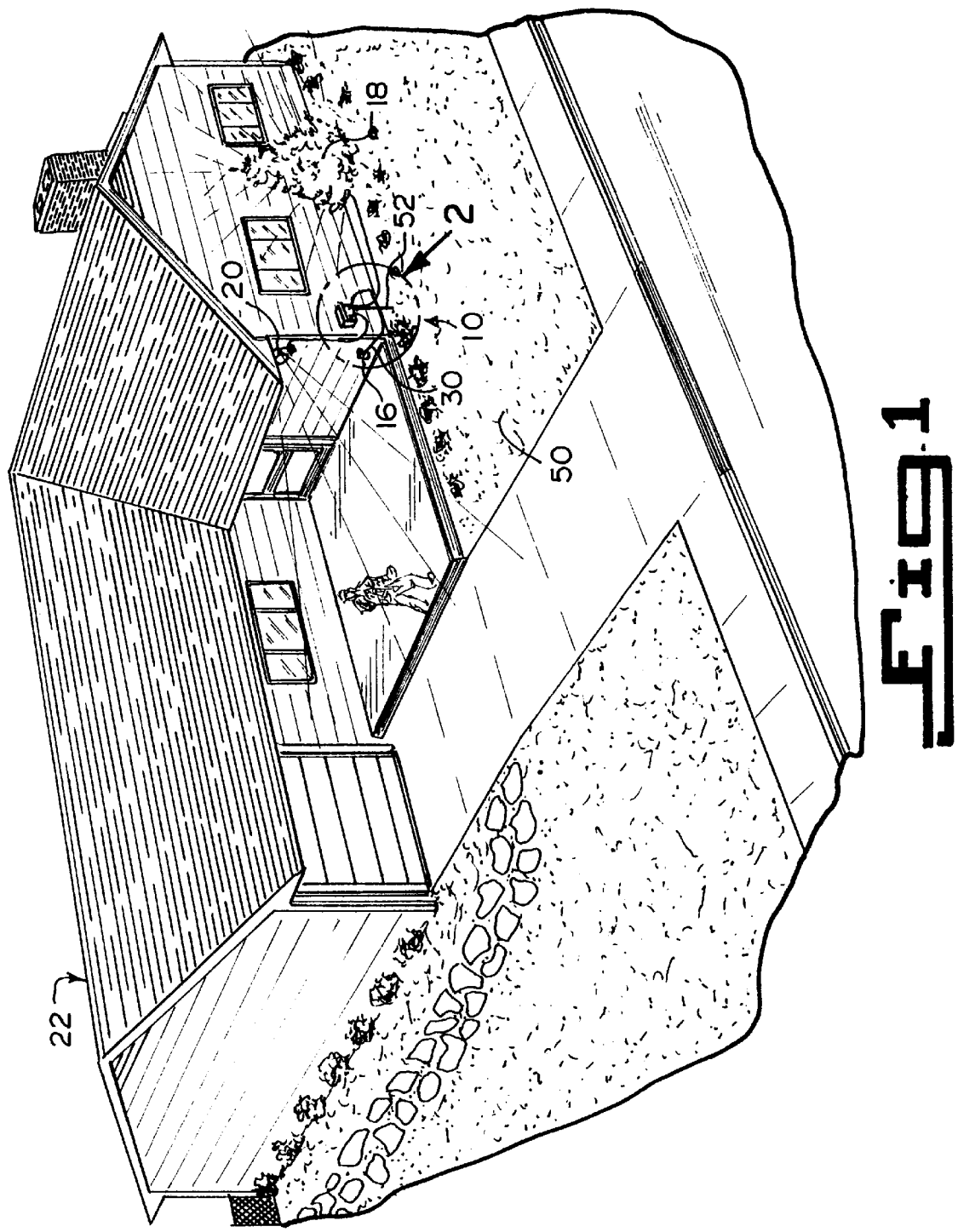
FIG. 1 is a perspective view of a house, showing the instant invention installed in place and in use.
Figure 2:
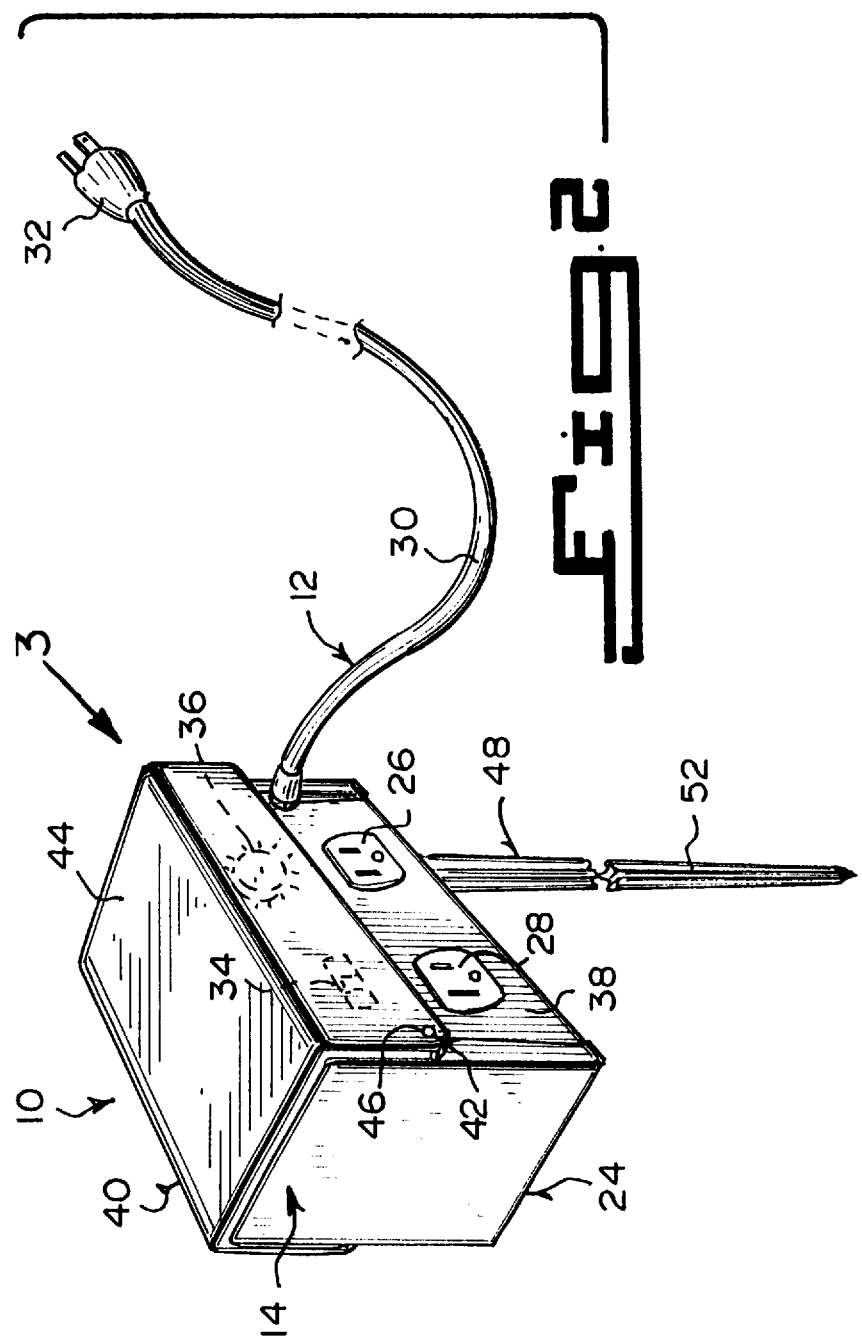
FIG. 2 is an enlarged perspective view of the instant invention per se, as indicated by arrow 2 in FIG. 1, with the protective cover in a closed position.
Figure 3:
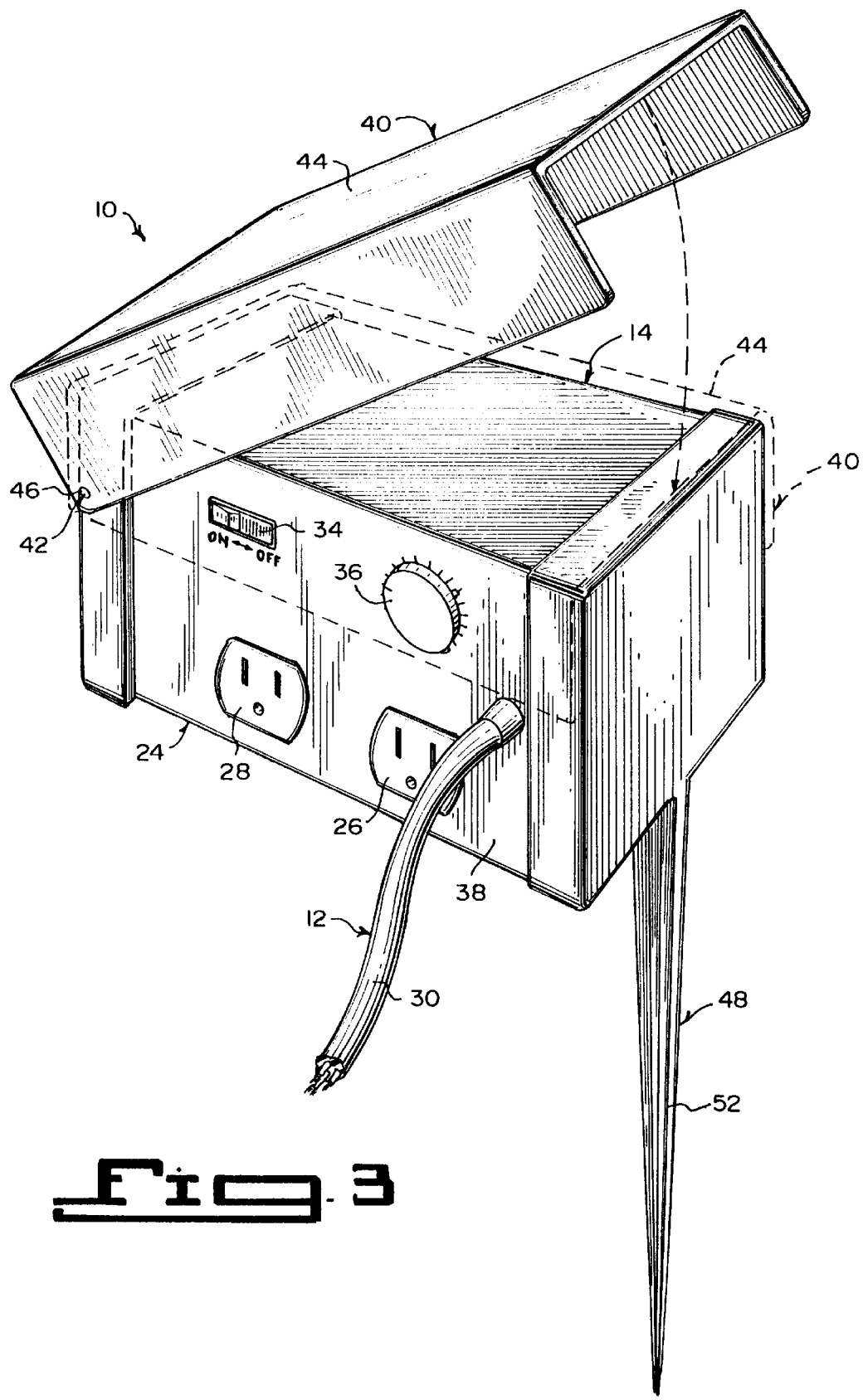
FIG. 3 is a further enlarged perspective view taken in the direction of arrow 3 in FIG. 2, with the protective cover in an opened position.

Turning now descriptively to the drawings, in which similar reference characters denote similar elements throughout the several views, FIGS. 1 through 3 illustrate an outdoor electrical outlet protector 10 comprising a waterproof extension cord 12. A timer 14 is electrically built into the waterproof extension cord 12, which will safely connect an outdoor electrical outlet 16 to exterior Christmas lights 18 and exterior security lights 20 on a building 22.

The waterproof extension cord 12 consists of a protective casing 24 to carry the timer 14 therein. A first electrical receptacle 26 is mounted in the protective casing 24 and is electrically connected to the timer 14, for plugging thereinto an electrical plug from the exterior Christmas lights 18. A second electrical receptacle 28 is mounted in the protective casing 24 and is electrically connected to the timer 14, for plugging thereinto an eletrical plug from the exterior security lights 20.

A power cord 30 is electrically connected at a first end to the timer 14 within the protective casing 24. An electrical plug 32 is on a second end of the power cord 30, for plugging into the outdoor electrical outlet 16.

The timer 14 includes an on/off switch 341 to control electrical service from the waterproof extension cord 12 to the timer 14. The timer 14 further includes a dial 36 to set a clock mechanism therein, to perform switching operations at predetermined time intervals. The on/off switch 34 and the dial 36 are in a side-by-side location on a front face 38 of the protective casing 24, above the first electrical receptacle 26 and the second electrical receptacle 28 that are also in a side-by-side location on the front face 38 of the protective casing 24.

The outdoor electrical outlet protector 10 further contains a protective cover 40. A facility 42 is for hinging one side of the protective cover 40 to a top end of the protective casing 24. The protective cover 40 can swing from an opened position, as shown in FIG. 3, to a closed position, as shown in FIG. 2, to protect the on/off switch 24 and the dial 36 of the timer 14.

The protective cover 40 is an inverted U-shaped channel member 44, sized to fit over a top portion of the protective casing 24. The hinging facility 42 is a pair of pivot pins 46. Each pivot pin 46 extends through the protective cover 40 and the protective casing 24.

The outdoor electrical outlet protector 10 further comprises a component 48 for elevating the protective casing 24 above the ground 50 at the building 22. The elevating component 48 is an elongated stake 52 extending downwardly from a bottom end of the protective casing 24. The elongated stake 52 can be inserted into the ground 50, to keep the protective casing 24 above the ground 50.

Operation of the Invention

To use the outdoor electrical outlet protector 10, the following steps should be taken:

1. Insert the elongated stake 52 into the ground 50 adjacent the outdoor electrical outlet 16.
2. Plug the electrical plug 32 on the power cord 30 into the outdoor electrical outlet 16.
3. Plug the electrical plug from the exterior Christmas lights 18 into the first electrical receptacle 26 on the protective casing 24.
4. Plug the electrical plug from the exterior security lights 20 into the second electrical receptacle 28 on the protective casing 24.
5. Turn the on/off switch 34 of the timer 14 to the on position.
6. Set the dial 36 of the timber 14 to the proper time interval needed to operate the exterior Christmas lights 18 and the exterior security lights 20.

List of Reference Numbers 10 outdoor electrical outlet protector
12 waterproof extension cord of 10
14 timer of 10 in 12
16 outdoor electrical outlet
18 exterior Christmas lights
20 exterior security lights
22 building
24 protective casing of 12
26 first electrical receptacle of 12 in 24
28 second electrical receptacle of 12 in 24
30 power cord of 12
32 electrical plug of 12 on 30
34 on/off switch of 14
36 dial of 14
38 front face of 24
40 protective cover of 10
42 hinging facility for 40
44 inverted U-shaped channel member for 40
46 pivot pin of 42
48 elevating component of 10
50 ground at 22
52 elongated stake for 48

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An outdoor electrical outlet protector comprising:
   a) a waterproof extension cord; and
   b) a timer electrically built into said waterproof extension cord, which will safely connect an outdoor electrical outlet to exterior Christmas lights and exterior security lights on a building, said waterproof extension cord including:

i) a protective casing to carry said timer therein;

ii) a first electrical receptacle mounted in said protective casing and electrically connected to said timer, for plugging thereinto an electrical plug from the exterior Christmas lights;

iii) a second electrical receptacle mounted in said protective casing and electrically connected to said timer, for plugging thereinto an electrical plug from the exterior security lights;

iv) a power cord electrically connected at a first end to said timer within said protective casing; and v) an electrical plug on a second end of said power cord, for plugging into the outdoor electrical outlet said electrical outlet protector further comprising means for elevating said protective casing above the ground at the building, said elevating means being an elongated stake extending downwardly from a bottom end of said protective casings, whereby said elongated stake can be inserted into the ground, to keep said protective casing above the ground.

2. An outdoor electrical outlet protector as recited in claim 1, wherein said timer includes an on/off switch, to control electrical service from said waterproof extension cord to said timer.

3. An outdoor electrical outlet protector as recited in claim 2, wherein said timer further includes a dial to set a clock mechanism therein, to perform switching operations at predetermined time intervals.

4. An outdoor electrical outlet protector as recited in claim 3, wherein said timer includes an on/off switch and a dial which are in a side-by-side location on a front face of said protective casing above said first electrical receptacle and said second electrical receptacle that are in a side-by-side location on said front face of said protective casing.

5. An outdoor electrical outlet protector as recited in claim 4, further including:

a) a protective cover; and b) means for hinging one side of said protective cover to a top end of said protective casing, so that said protective cover can swing from an opened position to a closed position, to protect said on/off switch and said dial of said timer.

6. An outdoor electrical outlet protector as recited in claim 5, wherein said protective cover is an inverted U-shaped channel member sized to fit over a top portion of said protective casing.

7. An outdoor electrical outlet protector as recited in claim 6, wherein said hinging means is a pair of pivot pins in which each said pivot pin extends through said protective cover and said protective casing.

8. An outdoor electrical outlet protector as recited in claim 7, further including means for elevating said protective casing above the ground at the building.

9. An outdoor electrical outlet protector as recited in claim 8, wherein said elevating means is an elongated stake extending downwardly from a bottom end of said protective casing, whereby said elongated stake can be inserted into the ground, to keep said protective casing above the ground.

10. An outdoor electrical outlet protector as recited in claim 1, wherein said timer further includes a dial to set a clock mechanism therein, to perform switching operations at predetermined time intervals.

11. An outdoor electrical outlet protector as recited in claim 1, wherein said timer includes an on/off switch and a dial which are in a side-by-side location on a front face of said protective casing above said first electrical receptacle and said second electrical receptacle that are in a side-by-side location on said front face of said protective casing.

12. An outdoor electrical outlet protector as recited in claim 11, further including:

a) a protective cover; and b) means for hinging one side of said protective cover to a top end of said protective casing, so that said protective cover can swing from an opened position to a closed position, to protect said on/off switch and said dial of said timer.

13. An outdoor electrical outlet protector as recited in claim 12, wherein said protective cover is an inverted U-shaped channel member sized to fit over a top portion of said protective casing.

14. An outdoor electrical outlet protector as recited in claim 12, wherein said hinging means is a pair of pivot pins in which each said pivot pin extends through said protective cover and said protective casing.

* * * * *